Patented Jan. 24, 1928.

1,657,062

UNITED STATES PATENT OFFICE.

GUSTAVE E. BENSEL, OF SPRECKELS, CALIFORNIA.

HERBICIDE.

No Drawing. Application filed December 28, 1925. Serial No. 78,006.

My invention relates to herbicides, and one of the objects of the invention is the provision of a weed killer of special value in the control of perennial weeds, such as morning glory, wild heliotrope, wild mint, white malva, hoary cress, and other growths having a deep underground root system.

Another object of the invention is the provision of a herbicide the efficacy of which depends on leaf absorption.

Other objects of the invention together with the foregoing will be set forth in the following description. It is to be understood that I do not limit myself to the showing made by the said description, as I may adopt variations of my preferred embodiment of the invention within the scope of the appended claims.

In terms of broad inclusion, the herbicide of my invention comprises an acid solution of arsenic trichloride and iron sulfate with acid sludge obtained as a by-product in the treatment of petroleum. The acid sludge contains sulfurous acid, sulfuric acid, phenols, hydrocarbons, and cyclic and heterocyclic organic compounds, all of which are chemicals of high toxicity and very destructive to plant life. The acid content of the sludge has a destructive action on the organic tissue of the plant, and the cyclic and heterocyclic compounds coagulate the nitrogenous elements and thus inhibit their distribution thru the plant structure, a condition which in itself would cause the death of the plant. The arsenic salt is a deadly plant poison, but like the other poisonous agents, it must be brought into intimate contact with the plant structure to be effective. The function of the iron sulfate is that of a vehicle to effect the distribution of the other poisons thru the tissue of the plant.

In the manufacture of my herbicide in concentrated form, I add twenty-one pounds of white arsenic, $As_2O_3$ to ten gallons of hydrochloric acid of commercial grade having a specific gravity of about 20 degrees Baumé. The acid is placed in a suitable receptacle in a water bath and preferably heated by steam to a temperature of about 80 degrees centigrade so that the arsenic is not vaporized and driven off. In order to facilitate the reaction, the mixture is agitated, preferably by the introduction of air under pressure into the lower portion of the liquid. The fumes and vapors evolved during the reaction should be conducted into a separate receptacle and neutralized in a soda solution. The reaction may be expressed in the following formula:

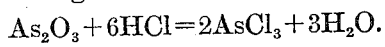

$$As_2O_3 + 6HCl = 2AsCl_3 + 3H_2O.$$

An excess of acid over that actually required for the reaction is included, so that the excess acid is present in the resulting solution in which the arsenic trichloride is dissolved. The reaction takes about an hour to complete and the resulting liquid is clear and transparent.

The heat may now be discontinued and 21 pounds of iron sulfate, preferably the ferrous salt, is added. This dissolves in the liquid without chemical reaction. It is not necessary to heat the liquid, but mechanical agitation is desirable to hasten the solution. I now have arsenic trichloride and iron sulfate in an acid solution. Under certain circumstances and with some plants, this acid solution when properly diluted is an effective poison.

I now let the liquid containing the arsenic trichloride and the iron sulfate in acid solution cool off to the temperature of the surrounding air, and then add a sufficient quantity of acid sludge to double the volume of the mixture. On account of the exothermic reaction, the acid sludge should be added gradually while the arsenic and iron solution is stirred, and the mixing should be performed preferably in an iron container.

After the mixing is completed, the herbicide in concentrated form is finished, and may be used by diluting one part of the concentrated compound with nine parts of water. The concentrated material has a specific gravity of 41 degrees Baumé, and is a stable product completely soluble in water.

After dilution, the weed killer is best applied to the foliage of the weeds by means of a fine spray under high pressure. The time required to destroy the roots depends upon many factors, including the nature of the plant, the amount of surface of the foliage, the season of the year, the thoroughness of the application and other factors, but in all cases in which the poison is properly applied the destruction is completed within 30 days.

The sludge is preferably a kerosene acid sludge which is soluble in water. The sludge is a cheap source of the desired sulfur compounds, as well as other active poisons. Any crude material containing sulfurous or sulfuric acid or both sulfurous and sulfuric acids may be substituted for the acid sludge, but of course such a compound will lack the other valuable ingredients found in the sludge, including the cyclic compounds which contribute very materially to the destructive action of the weed killer by their action in coagulating the nitrogenous elements of the plant structure. Chemically, I would consider antimony an equivalent of arsenic trioxide in my composition, but on account of the much higher cost of antimony, its use is not practicable.

The function of the iron sulfate is that of a vehicle or carrier to facilitate the penetration of the poisonous fluid into the deeper fibers of the plant. I prefer to use the ferrous sulfate on account of its ready solubility and cheapness, but the ferric sulfates may also be used if desired. I have also found that all of the nitrates and all of the water-soluble manganese salts make good vehicles. All of these salts would be used in about the same proportion as the ferrous sulfate, which I prefer.

I claim:

1. A herbicide comprising arsenic, iron sulfate, and acid petroleum sludge.

2. A herbicide comprising the product of the reaction of arsenic trioxide, hydrochloric acid, iron sulfate, and acid petroleum sludge.

3. A herbicide comprising the product of mixing acid petroleum sludge with a solution of iron and arsenic.

4. A composition of matter comprising a mixture of iron sulfate, arsenic and a sludge containing sulfuric acid.

5. A composition of matter comprising a mixture of iron sulfate, arsenic and a sludge containing cyclic compounds.

6. A composition of matter comprising a mixture of iron sulfate, arsenic and a sludge containing sulfuric acid and cyclic compounds.

7. A composition of matter comprising a mixture of iron sulfate, arsenic, and a sludge containing sulfuric acid, sulfurous acid and cyclic compounds.

8. A composition of matter comprising a mixture of iron sulfate, arsenic, and an acid sludge containing cyclic compounds.

9. A composition of matter comprising the product of mixing arsenic trichloride, iron sulfate and a sludge containing sulfuric acid and cyclic compounds.

10. A composition of matter comprising arsenic trichloride and iron sulfate in an acid solution.

11. A composition of matter comprising the product of the reaction of arsenic trioxide, hydrochloric acid, iron sulfate and a water-soluble sludge by-product from the treatment of petroleum.

12. A composition of matter containing the following ingredients in substantially the proportions stated: 21 lbs. white arsenic, 10 gals. hydrochloric acid, 21 lbs. iron sulfate, enough acid petroleum sludge to double the volume.

13. The process of making a herbicide which comprises reacting white arsenic with hydrochloric acid, dissolving an iron sulfate in the liquid, and adding to the mixture thus obtained an acid petroleum sludge.

14. The process of making a herbicide which comprises first making arsenic trichloride in an acid solution by treating white arsenic with hydrochloric acid in a volume greater than required for complete reaction, then dissolving iron sulfate in the acid solution, and finally adding a water-soluble sludge by-product from the treatment of petroleum.

15. The process of making a herbicide which comprises first making arsenic trichloride in an acid solution by treating white arsenic with hydrochloric acid in a volume greater than required for complete reaction, and then dissolving iron sulfate in the acid solution.

16. A herbicide comprising arsenic, an acid petroleum sludge, and a water soluble carrier salt to facilitate the penetration of the poisons.

In testimony whereof, I have hereunto set my hand.

GUSTAVE E. BENSEL.